United States Patent
Liu et al.

(10) Patent No.: US 11,295,561 B2
(45) Date of Patent: Apr. 5, 2022

(54) VEHICLE EVALUATION METHOD, VEHICLE EVALUATION EQUIPMENT AND COMPUTER READABLE STORAGE MEDIUM

(71) Applicant: Shenzhen Launch Software Co., Ltd., Shenzhen (CN)

(72) Inventors: Jun Liu, Shenzhen (CN); Zewei Wei, Shenzhen (CN); Wei Zhan, Shenzhen (CN)

(73) Assignee: Shenzhen Launch Software Co., Ltd, Shenzhen (CN)

(*) Notice: Subject to any disclaimer, the term of this patent is extended or adjusted under 35 U.S.C. 154(b) by 743 days.

(21) Appl. No.: 16/099,138

(22) PCT Filed: Mar. 21, 2018

(86) PCT No.: PCT/CN2018/079833
§ 371 (c)(1),
(2) Date: Nov. 5, 2018

(87) PCT Pub. No.: WO2019/178769
PCT Pub. Date: Sep. 26, 2019

(65) Prior Publication Data
US 2021/0183178 A1 Jun. 17, 2021

(51) Int. Cl.
*G01M 17/00* (2006.01)
*G07C 5/08* (2006.01)
(Continued)

(52) U.S. Cl.
CPC .......... *G07C 5/0808* (2013.01); *G06Q 10/20* (2013.01); *G06Q 30/018* (2013.01); *G07C 5/008* (2013.01); *G07C 5/0841* (2013.01)

(58) Field of Classification Search
CPC .... G07C 5/0808; G07C 5/008; G07C 5/0841; G06Q 10/20; G06Q 30/018
See application file for complete search history.

(56) References Cited

U.S. PATENT DOCUMENTS

| 4,989,144 A | 1/1991 | Barnett, III |
| 10,805,068 B1* | 10/2020 | Leise .................. H04L 63/0442 |

(Continued)

FOREIGN PATENT DOCUMENTS

| CN | 101241573 A | 8/2008 |
| CN | 101359426 | 2/2009 |

(Continued)

OTHER PUBLICATIONS

Extended European Search Report of EP18811699.0 dated Jan. 23, 2020, 8 pages.

*Primary Examiner* — Adam M Alharbi
(74) *Attorney, Agent, or Firm* — Rankin, Hill & Clark LLP

(57) ABSTRACT

A vehicle evaluation method and equipment, the vehicle evaluation method comprises: obtaining current vehicle data of a target vehicle, wherein the current vehicle data includes a vehicle identification; obtaining historical vehicle data of the target vehicle according to the vehicle identification; determining an authenticity of the current vehicle data according to the historical vehicle data; and evaluating the target vehicle according to a determination of the authenticity, and generating an evaluation report of the target vehicle. In the present solution, a detection and an evaluation of the vehicle can be implemented more comprehensively, and an accuracy of vehicle evaluation can be improved.

17 Claims, 5 Drawing Sheets

(51) Int. Cl.
    *G06Q 10/00*     (2012.01)
    *G06Q 30/00*     (2012.01)
    *G07C 5/00*     (2006.01)

(56) References Cited

U.S. PATENT DOCUMENTS

| | | |
|---|---|---|
| 2003/0088348 A1 | 5/2003 | Gustavsson |
| 2006/0009885 A1 | 1/2006 | Raines et al. |
| 2011/0246468 A1 | 10/2011 | Raines |
| 2013/0226366 A1 | 8/2013 | Biondo |
| 2013/0304276 A1* | 11/2013 | Flies ............ G07C 5/085 701/1 |
| 2014/0046800 A1* | 2/2014 | Chen ............ G06Q 30/0623 705/26.61 |
| 2014/0195099 A1 | 7/2014 | Chen |
| 2014/0279169 A1* | 9/2014 | Leos ............ G06Q 10/20 705/26.4 |
| 2015/0012169 A1* | 1/2015 | Coard ............ G06Q 20/202 701/29.1 |
| 2015/0206357 A1* | 7/2015 | Chen ............ G06F 16/2425 701/31.4 |
| 2015/0330808 A1 | 11/2015 | Deml et al. |

FOREIGN PATENT DOCUMENTS

| | | |
|---|---|---|
| CN | 104494540 A | 4/2015 |
| CN | 104978534 A | 10/2015 |
| CN | 105336176 | 2/2016 |
| CN | 105371864 | 3/2016 |
| CN | 107729770 | 2/2018 |
| CN | 107818322 A | 3/2018 |

* cited by examiner

VEHICLE EVALUATION METHOD, VEHICLE EVALUATION EQUIPMENT AND COMPUTER READABLE STORAGE MEDIUM

CROSS-REFERENCE TO RELATED APPLICATIONS

This application is a national phase application under 35 U.S.C. § 371 of International Patent Application No. PCT/CN2018/079833 filed Mar. 21, 2018, the entire contents of which are incorporated herein by reference for all purposes.

TECHNICAL FIELD

The present application pertains to the technical field of vehicles, and more particularly to a vehicle evaluation method, and a vehicle evaluation equipment.

BACKGROUND

With the continuous development of technology and the continuous improvement of people's living levels, vehicle replacement speeds are becoming faster and faster, behaviors of purchasing and selling of used cars are being accepted gradually by people.

In the related art, detections and evaluations of the used cars need to be performed before they are transacted; generally, there are professional vehicle evaluators who perform evaluations for vehicles on a used car transaction platform, they mainly detect mileages of the vehicles, appearances of the vehicles, and whether there is a problem such as a water leakage, an oil leakage, etc.

A shortcoming of the related art is that, only current conditions of the vehicles can be evaluated, while the faults, accidents or historical usage conditions of the vehicles that occur previously is difficult to be found out, such that the assessment of the vehicles are not full, and the accuracies of evaluation of the vehicles are poor.

Technical Problem

In view of this, embodiments of the present solution provide a vehicle evaluation method, a vehicle evaluation device, and a vehicle evaluation equipment, which can solve a technical problem in related art that an accuracy of evaluation of vehicles is poor.

Technical Solution

In a first aspect, embodiments of the present solution provide a vehicle evaluation method, comprising: obtaining current vehicle data of a target vehicle, wherein the current vehicle data includes a vehicle identification;

obtaining historical vehicle data of the target vehicle according to the vehicle identification;

determining an authenticity of the current vehicle data according to the historical vehicle data; and evaluating the target vehicle according to a determination of the authenticity, and generating an evaluation report of the target vehicle.

Optionally, said determining an authenticity of the current vehicle data according to the historical vehicle data particularly comprises:

obtaining current vehicle mileage information in the current vehicle data;

obtaining historical vehicle mileage information in the historical vehicle data; and determining the authenticity of the current vehicle data according to a relationship between the historical vehicle mileage information and the current vehicle mileage information.

Optionally, the vehicle identification includes a vehicle license plate number and a vehicle identification number; said obtaining historical vehicle data of the target vehicle according to the vehicle identification particularly comprises: obtaining the historical vehicle data of the target vehicle according to the vehicle license plate number or the vehicle identification number;

said determining an authenticity of the current vehicle data according to the historical vehicle data particularly comprises:

determining whether a vehicle identification number in the historical vehicle data is consistent with a vehicle identification number in the current vehicle data by comparing, when the historical vehicle data of the target vehicle is obtained according to the vehicle license plate number; and determining the authenticity of the current vehicle data according to the determination result of consistency; and determining whether the vehicle identification number in the historical vehicle data is consistent with the vehicle identification number in the current vehicle data by comparing, when the historical vehicle data of the target vehicle is obtained according to the vehicle identification number; and determining the authenticity of the current vehicle data according to the determination result of consistency.

Optionally, said evaluating the target vehicle according to a determination of the authenticity, and generating an evaluation report of the target vehicle particularly comprises:

evaluating a performance and a condition of the target vehicle according to the current vehicle data and the historical vehicle data, and generating the evaluation report according to the performance and the condition, when the determination reveals that the current vehicle data is authentic.

Optionally, said evaluating the target vehicle according to a determination of the authenticity, and generating an evaluation report of the target vehicle particularly comprises:

evaluating a performance and a condition of the target vehicle according to the historical vehicle data, and generating the evaluation report according to the performance, the condition and inauthenticity information, when the determination reveals that the current vehicle data is unauthentic.

In a third aspect, embodiments of the present solution provide a vehicle evaluation equipment comprising a storage device, a processor and computer program stored in the storage device and executable by the processor, when the computer program is executed by the processor, the processor is configured to implement steps of a vehicle evaluation method by obtaining current vehicle data of a target vehicle, wherein the current vehicle data includes a vehicle identification; obtaining historical vehicle data of the target vehicle according to the vehicle identification; determining authenticity of the current vehicle data according to the historical vehicle data; and evaluating the target vehicle according to the determination of the authenticity, and generating an evaluation report of the target vehicle.

Optionally, the processor is configured to implement the step of determining authenticity of the current vehicle data according to the historical vehicle data by obtaining current vehicle mileage information in the current vehicle data; obtaining historical vehicle mileage information in the historical vehicle data; and determining the authenticity of the current vehicle data according to a relationship between the historical vehicle mileage information and the current vehicle mileage information.

Optionally, the vehicle identification includes a vehicle license plate number and a vehicle identification number; wherein the processor is configured to implement the step of obtaining historical vehicle data of the target vehicle according to the vehicle identification by obtaining the historical vehicle data of the target vehicle according to the vehicle license plate number or the vehicle identification number;

the processor is configured to implement the step of determining an authenticity of the current vehicle data according to the historical vehicle data by: determining whether a vehicle identification number in the historical vehicle data is consistent with a vehicle identification number in the current vehicle data by comparing, when the historical vehicle data of the target vehicle is obtained according to the vehicle license plate number; and determining the authenticity of the current vehicle data according to the determination result of consistency; and determining whether a vehicle license plate number in the historical vehicle data is consistent with a vehicle license plate number in the current vehicle data by comparing, when the historical vehicle data of the target vehicle is obtained according to the vehicle identification number; and determining the authenticity of the current vehicle data according to the determination result of consistency.

Optionally, the processor is configured to implement the step of evaluating the target vehicle according to a determination of the authenticity, and generating an evaluation report of the target vehicle by: evaluating a performance and a condition of the target vehicle according to the current vehicle data and the historical vehicle data, and generating the evaluation report according to the performance and the condition, when the determination reveals that the current vehicle data is authentic.

Optionally, said evaluating the target vehicle according to the determination of the authenticity, and generating an evaluation report of the target vehicle particularly comprises:

evaluating a performance and a condition of the target vehicle according to the historical vehicle data and generating the evaluation report according to the performance, the condition and inauthenticity information, when the determination reveals that the current vehicle data is unauthentic. In a fourth aspect, embodiments of the present solution provide a computer readable storage medium which stores computer program, the computer program is executed by a processor to cause the processor to implement steps of a vehicle evaluation method by obtaining current vehicle data of a target vehicle, wherein the current vehicle data includes a vehicle identification; obtaining historical vehicle data of the target vehicle according to the vehicle identification; determining authenticity of the current vehicle data according to the historical vehicle data; and evaluating the target vehicle according to the determination of the authenticity, and generating an evaluation report of the target vehicle.

Optionally, said determining authenticity of the current vehicle data according to the historical vehicle data particularly comprises:

obtaining current vehicle mileage information in the current vehicle data;

obtaining historical vehicle mileage information in the historical vehicle data; and determining the authenticity of the current vehicle data according to a relationship between the historical vehicle mileage information and the current vehicle mileage information.

Optionally, the vehicle identification includes a vehicle license plate number and a vehicle identification number; said obtaining historical vehicle data of the target vehicle according to the vehicle identification particularly comprises: obtaining the historical vehicle data of the target vehicle according to the vehicle license plate number or the vehicle identification number;

said determining an authenticity of the current vehicle data according to the historical vehicle data particularly comprises:

determining whether a vehicle identification number in the historical vehicle data is consistent with a vehicle identification number in the current vehicle data by comparing, when the historical vehicle data of the target vehicle is obtained according to the vehicle license plate number; and determining the authenticity of the current vehicle data according to the determination result of consistency; and determining whether a vehicle license plate number in the historical vehicle data is consistent with a vehicle license plate number in the current vehicle data by comparing, when the historical vehicle data of the target vehicle is obtained according to the vehicle identification number; and determining the authenticity of the current vehicle data according to the determination result of consistency.

Optionally, said evaluating the target vehicle according to a determination of the authenticity, and generating an evaluation report of the target vehicle particularly comprises:

evaluating a performance and a condition of the target vehicle according to the current vehicle data and the historical vehicle data, and generating the evaluation report according to the performance and the condition, when the determination reveals that the current vehicle data is authentic.

Optionally, said evaluating the target vehicle according to the determination of the authenticity, and generating an evaluation report of the target vehicle particularly comprises:

evaluating a performance and a condition of the target vehicle according to the historical vehicle data and generating the evaluation report according to the performance, the condition and inauthenticity information, when the determination reveals that the current vehicle data is unauthentic. In a fifth aspect, embodiments of the present solution provide a computer program product which stores computer program, the computer program is executed by one or a plurality of processor(s) to cause the processor to implement steps of a vehicle evaluation method by obtaining current vehicle data of a target vehicle, wherein the current vehicle data includes a vehicle identification; obtaining historical vehicle data of the target vehicle according to the vehicle identification; determining authenticity of the current vehicle data according to the historical vehicle data; and evaluating the target vehicle according to the determination of the authenticity, and generating an evaluation report of the target vehicle.

Optionally, said determining authenticity of the current vehicle data according to the historical vehicle data particularly comprises:

obtaining current vehicle mileage information in the current vehicle data;

obtaining historical vehicle mileage information in the historical vehicle data; and determining the authenticity of the current vehicle data according to a relationship between the historical vehicle mileage information and the current vehicle mileage information.

Optionally, the vehicle identification includes a vehicle license plate number and a vehicle identification number; said obtaining historical vehicle data of the target vehicle according to the vehicle identification particularly comprises: obtaining the historical vehicle data of the target vehicle according to the vehicle license plate number or the vehicle identification number;

said determining an authenticity of the current vehicle data according to the historical vehicle data particularly comprises:

determining whether a vehicle identification number in the historical vehicle data is consistent with a vehicle identification number in the current vehicle data by comparing, when the historical vehicle data of the target vehicle is obtained according to the vehicle license plate number; and determining the authenticity of the current vehicle data according to the determination result of consistency; and determining whether a vehicle license plate number in the historical vehicle data is consistent with a vehicle license plate number in the current vehicle data by comparing, when the historical vehicle data of the target vehicle is obtained according to the vehicle identification number; and determining the authenticity of the current vehicle data according to the determination result of consistency.

Optionally, said evaluating the target vehicle according to a determination of the authenticity, and generating an evaluation report of the target vehicle particularly comprises:

evaluating a performance and a condition of the target vehicle according to the current vehicle data and the historical vehicle data, and generating the evaluation report according to the performance and the condition, when the determination reveals that the current vehicle data is authentic.

Optionally, said evaluating the target vehicle according to the determination of the authenticity, and generating an evaluation report of the target vehicle particularly comprises:

evaluating a performance and a condition of the target vehicle according to the historical vehicle data and generating the evaluation report according to the performance, the condition and inauthenticity information, when the determination reveals that the current vehicle data is unauthentic.

Advantageous Effects

In the vehicle evaluation method provided by the embodiment of the present solution, by obtaining the current vehicle data of the target vehicle, wherein the current vehicle data includes the vehicle identification, obtaining the historical vehicle data of the target vehicle according to the vehicle identification, determining the authenticity of the current vehicle data according to the historical vehicle data, and evaluating the target vehicle according to a determination of the authenticity, and generating the evaluation report of the target vehicle, such that a detection and an evaluation of the vehicle can be implemented more comprehensively, and an accuracy of vehicle evaluation can be improved.

BRIEF DESCRIPTION OF THE DRAWINGS

In order to describe the embodiments of the present application more clearly, embodiments or the accompanying drawings that need to be described in related art is briefly introduced below.

DESCRIPTION OF THE EMBODIMENTS

In the following description, in order to describe but not intended to limit, concrete details such as specific system structure, technique, and so on are proposed, thereby facilitating comprehensive understanding of the embodiments of the present application. In some other conditions, detailed explanations of method, circuit, device and system well known to the public are omitted, so that unnecessary details can be prevented from obstructing the description of the present application.

Embodiment I

Figure 1:
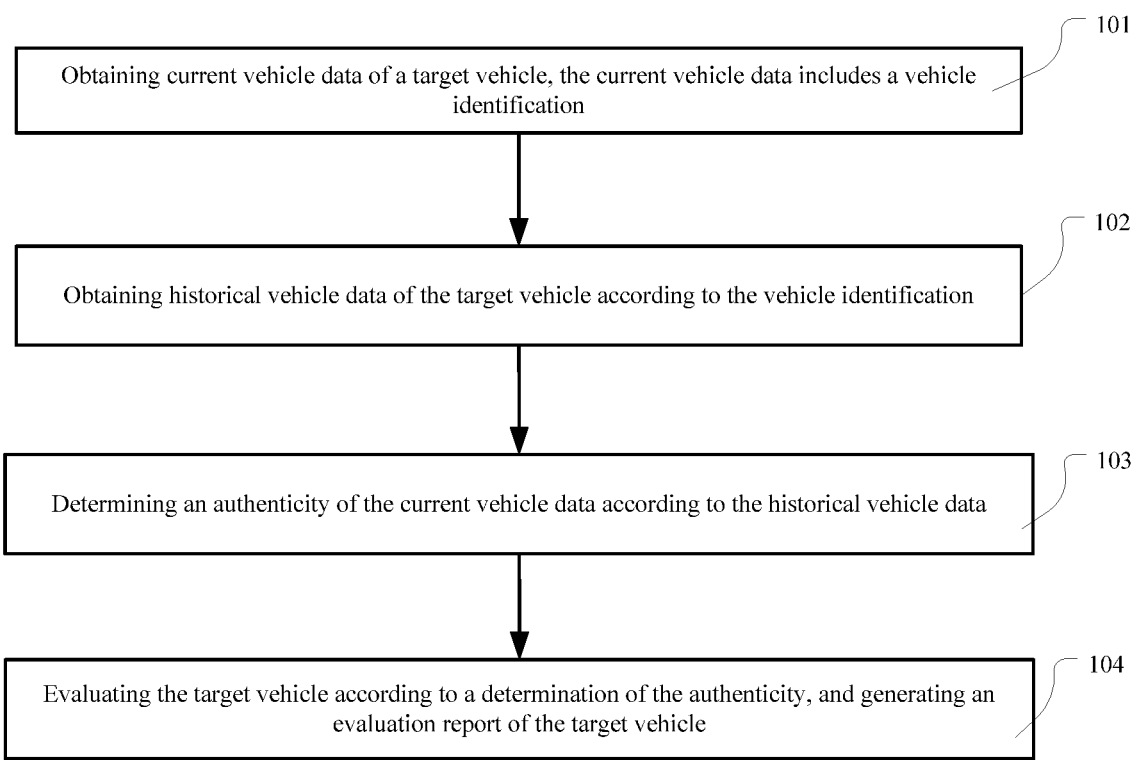
FIG. 1 illustrates a schematic flow chart of a vehicle evaluation method provided by embodiment I of the present solution.

Embodiment I of the present solution provides a vehicle evaluation method. FIG. 1 illustrates a schematic flow chart of the vehicle evaluation method provided by embodiment I of the present solution. As shown in FIG. 1, the method in this embodiment can comprise:

step 101, obtaining current vehicle data of a target vehicle, the current vehicle data includes a vehicle identification.

An executive main body of the method in this embodiment can be a vehicle evaluation device. The device can be a mobile phone, a tablet device, a computer, etc., and can also be a vehicle diagnostic equipment. The method in this embodiment can be applied in such as used car evaluating process, used cars selling process, and so on, and can also be used in a scenario in which a user performs an evaluation for the vehicle according to any need, such as a need for a self-diagnosis of the vehicle performed by the user.

The target vehicle can be a vehicle which is about to be evaluated, such as a used car that is about to be sold, and so on. The current vehicle data can include one or a plurality of data of the target vehicle. The current vehicle data can be as input by the user manually, and can be obtained directly from the vehicle. For example, the current vehicle data can include a regular diagnostic result as input by the user, and/or diagnostic information obtained via the OBD (On-Board Diagnostic) interface.

Wherein, the regular diagnostic result can include one or a plurality of items as follows: a use age of the vehicle, a mileage, whether there is a water leakage, whether there is an oil leakage, a condition of a system, etc. The system can be a system or an assembly of the vehicle; for example, the system can include one or a plurality of items: a vehicle body, a motor, a steering mechanism, a braking system, etc. The condition of the system can be a score, a grade, detailed information of the system, etc.

The user can perform a comprehensive manual diagnosis for the vehicle that is about to be evaluated, and input the regular diagnostic result. The user can be an evaluator in a used car transaction platform, or a vehicle owner, or a buyer, etc.

The diagnostic information of the vehicle can include one or a plurality of items as follows: VIN (Vehicle Identification Number), CVN (Calibration Verification Number), vehicle codes, data flow, freeze frame, etc. The vehicle evaluation device can be provided therein with an OBD interface, the diagnostic information of the vehicle can be obtained via the OBD interface.

Preferably, the current vehicle data can also include a vehicle identification which can include any one of the items as follows: vehicle license plate number, VIN.

Step 102, obtaining a historical vehicle data of the current vehicle according to the vehicle identification.

Optionally, after the vehicle identification of the target vehicle is obtained, the vehicle identification can be transmitted to a server, so that the server can search the historical vehicle data of the current vehicle. Wherein, the historical vehicle data of the target vehicle can be any data which is stored in the server previously and is related with the target vehicle.

There are various approaches for obtaining the historical vehicle data in the server. For example, when the vehicle leaves factory, the vehicle data can be uploaded onto the server; every time when performing a detection, a diagnosis, a repair and a maintenance for the vehicle, detected data and diagnostic data can be uploaded onto the server. In a driving process of the vehicle, data of the vehicle can also be uploaded onto the server. When a police officer performs the detection for the vehicle, he/she can also upload the vehicle data onto the server. The server stores these data as the historical vehicle data.

Preferably, the historical vehicle data can include one or a plurality of items described as follows: the vehicle license plate number, VIN, vehicle type information, vehicle year model information, manufacturer information, vehicle owner information, historical mileage information, historical repairing information, historical maintenance information, historical fault information, etc.

Step 103, determining an authenticity of the current vehicle data according to the historical vehicle data.

Particularly, it is possible to compare the historical vehicle data with the current vehicle data, if there are contradictory contents, the current vehicle data is considered as unauthentic. For example, if a vehicle shipment time recorded in the historical vehicle data doesn't correspond to the vehicle shipment time of the current vehicle data, the current vehicle data is considered as unauthentic.

Step 104, evaluating the target vehicle according to a determination of the authenticity, and generating an evaluation report of the target vehicle.

Optionally, when the determination reveals that the current vehicle data is authentic, a performance and a condition of the target vehicle can be evaluated according to the current vehicle data and the historical vehicle data, and the evaluation report can be generated according to the performance and the condition. When the determination reveals that the current vehicle data is unauthentic, the performance and the condition of the target vehicle can be evaluated according to the historical vehicle data, and the evaluation report can be generated according to the performance, the condition and inauthenticity information. The performance can include a power performance of the vehicle, a braking performance, a stability of operation, a fuel economy, etc., the condition can include mileage information, whether there is a fault, etc. The inauthenticity information can be referred to as the information which is included in the current vehicle data and conflicts with the historical vehicle data.

The content of the evaluation report can be set according to an actual need. For example, the evaluation report can include the performance, the condition and the inauthenticity information (if any) of the vehicle, and can include the evaluation result obtained according to the performance, the condition and the inauthenticity information of the vehicle, etc. The evaluation result of the vehicle can be used for representing an estimated value of the vehicle. Optionally, the evaluation result can include a grade of the vehicle condition such as excellent, good, middle, bad, or first class, second class, third class. The evaluation result can also include an assessment score, the higher the score, the higher the assessment value. For example, one or a plurality of item(s) recorded in the historical vehicle data can be obtained, the items are described as follows: a historical maintenance frequency, a historical fault information, a historical maintenance result. The grade of the vehicle condition or the assessment score can be determined according to one or a plurality of item(s) of the historical maintenance frequency, the historical fault information and the historical maintenance result.

The more the historical maintenance frequency, the lower the grade of the vehicle condition; the more or the severer the historical fault information, the lower the grade of the vehicle condition; the worse the historical maintenance result, the lower the grade of the vehicle condition. A scoring standard which corresponds to the historical maintenance frequency, the historical fault information and the historical maintenance result can be preset; for example, every time when the historical maintenance frequency is added once, one score is deducted, and the assessment score or the grade of vehicle condition corresponding to the vehicle is determined according to the historical maintenance frequency, the historical fault information and the historical maintenance result. In an actual application, when the user needs to buy a used car, he/she can obtain the current vehicle data and the historical vehicle data of the target vehicle according to the method provided by this embodiment, judge the authenticity of the current vehicle data according to the historical vehicle data, and evaluate the target vehicle according to the authenticity, the evaluation report can be presented as a reference to the user when the user chooses to buy the used car.

In the vehicle evaluation method provided by this embodiment, by obtaining the current vehicle data of the target vehicle, wherein the current vehicle data includes the vehicle identification, obtaining the historical vehicle data of the target vehicle according to the vehicle identification, determining the authenticity of the current vehicle data according to the historical vehicle data, and evaluating the target vehicle according to a determination of the authenticity, and generating the evaluation report of the target vehicle, such that a detection and an evaluation of the vehicle can be implemented more comprehensively, and an accuracy of vehicle evaluation can be improved.

Based on the technical solution provided by the aforesaid embodiment, preferably, the vehicle identification can include the vehicle license plate number and the VIN. Said obtaining the historical vehicle data of the target vehicle according to the vehicle identification in step 102 can particularly comprise: obtaining the historical vehicle data of the target vehicle according to the vehicle license plate number or the VIN.

Correspondingly, said determining the authenticity of the current vehicle data according to the historical vehicle data in step 103 can particularly comprise: determining a consistency between a VIN in the historical vehicle data and a VIN in the current vehicle data by comparing when the historical vehicle data of the target vehicle is obtained according to the vehicle license plate number; determining the authenticity of the current vehicle data according to the result of the consistency; determining the consistency between a vehicle license plate number in the historical vehicle data and a vehicle license plate number in the current vehicle data by comparing when the historical vehicle data of the target vehicle is obtained according to the VIN, and determining the authenticity of the current vehicle data according to the result of the consistency.

Particularly, if the VIN in the historical vehicle data is consistent with the VIN in the current vehicle data, the current vehicle data is considered as authentic, if the VIN in the historical vehicle data isn't consistent with the VIN in the current vehicle data, the current vehicle data is considered as unauthentic; if the vehicle license plate number in the historical vehicle data is consistent with the vehicle license plate number in the current vehicle data, the current vehicle data is considered as authentic, if the vehicle license plate number in the historical vehicle data isn't consistent with the vehicle license plate number in the current vehicle data, the current vehicle data is considered as unauthentic.

The authenticity of the current vehicle data is verified according to the vehicle identification, there is a simple and fast verification with higher accuracy, those vehicles the vehicle license plate number or the VIN of which has been falsified can be found out fast, users can be avoided from being tricked.

Optionally, the vehicle license plate number can be obtained by any one of the following methods: receiving the vehicle license plate number as input by the user, and obtaining the vehicle license plate number by scanning or photographing the vehicle license plate of the vehicle; obtaining the vehicle license plate by scanning or photographing a driving license. The VIN can be obtained by any one of the following methods: receiving the VIN as input by the user; obtaining the VIN via the OBD interface; obtaining the VIN by scanning or photographing the vehicle body; obtaining the VIN by scanning the driving license.

Embodiment II

Embodiment II of the present solution provides a vehicle evaluation method. This embodiment judges an authenticity of the current vehicle data by mileage information based on the technical solution provided by embodiment I of the present solution.

Figure 2:
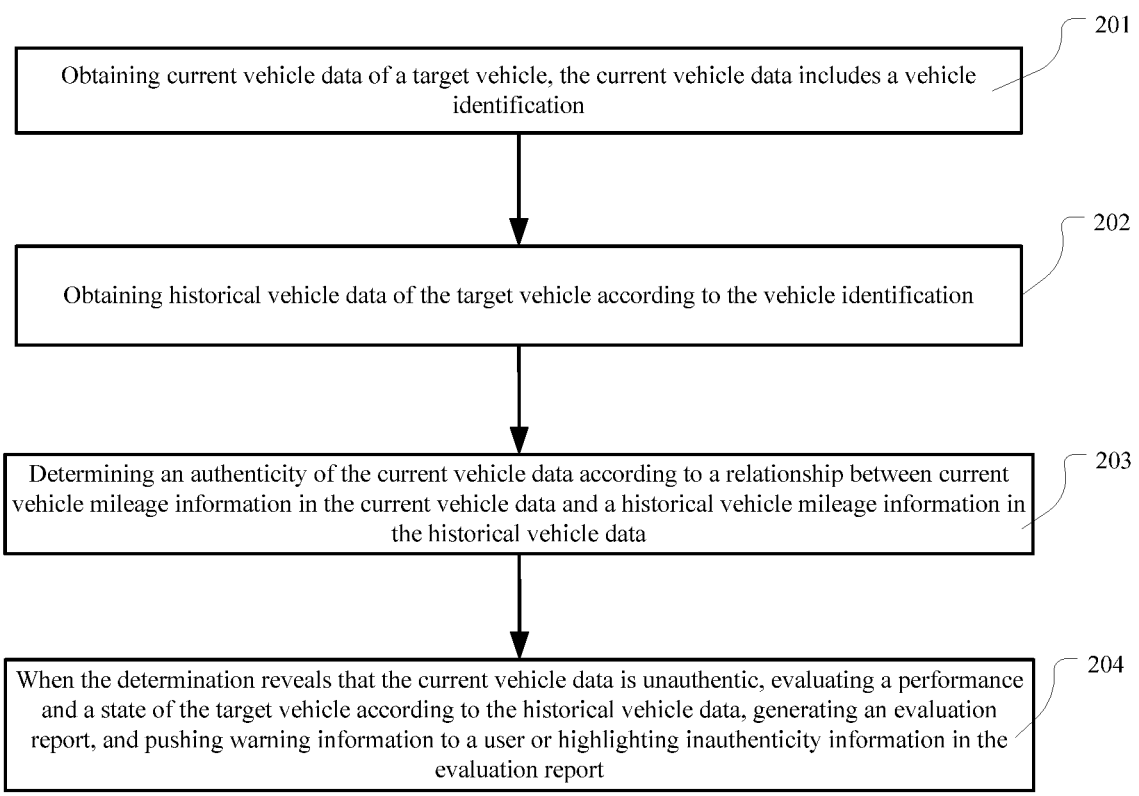
FIG. 2 illustrates a schematic flow chart of a vehicle evaluation method provided by embodiment II of the present solution.

FIG. 2 illustrates a schematic flow chart of the vehicle evaluation method provided by embodiment II of the present solution. As shown in FIG. 2, the method in this embodiment can comprise:

Step 201, obtaining current vehicle data of a target vehicle, the current vehicle data includes a vehicle identification.

Step 202, obtaining a historical vehicle data of the target vehicle according to the vehicle identification.

In this embodiment, regarding specific implementation modes of steps 201-202, please refer to steps 101-102 in embodiment I, it is not repeatedly described herein.

Optionally, in this embodiment, the current vehicle data can include current vehicle mileage information, the historical vehicle data can include historical vehicle mileage information.

Step 203, determining an authenticity of the current vehicle data according to a relationship between the current vehicle mileage information in the current vehicle data and the historical vehicle mileage information in the historical vehicle data.

The current vehicle mileage information can be the mileage information read out from an odometer or obtained from an OBD (On-Board Diagnosis) interface of the vehicle, the historical vehicle mileage information can be the mileage information of the vehicle stored in a server.

The current vehicle mileage information should be no less than the historical vehicle mileage information, if the current vehicle mileage information is less than the historical vehicle mileage information, the current vehicle data is considered as unauthentic.

Optionally, said determining the authenticity of the current vehicle data can comprise: obtaining the historical vehicle mileage information and a corresponding geographic location information; deducting the historical vehicle mileage information from the current vehicle mileage information so as to obtain a mileage difference value, and calculating a distance between the geographic location information that corresponds to the historical vehicle mileage information and a current geographic location information of the vehicle; determining whether the current vehicle data is authentic according to the mileage difference value and the distance.

Particularly, every time when a device uploads the mileage information of the vehicle onto the server, the device can upload geographic location information corresponding to the vehicle when the vehicle is driven to the mileage onto the server simultaneously, so that the server can store the geographic location information correspondingly.

When performing an evaluation for the vehicle, the pre-stored historical mileage information and the corresponding geographic location information can be obtained from the server, and a difference between the current vehicle mileage information and the historical mileage information can be calculated and taken as the mileage difference value; when the current vehicle mileage is larger than the historical vehicle mileage, the mileage difference value is a positive value; when the current vehicle mileage is less than the historical vehicle mileage, the mileage difference value is a negative value.

A distance between locations corresponding to the twice recorded mileage information can be calculated according to the geographic location information corresponding to the historical vehicle mileage information, and the current geographic location information of the vehicle. Supposing that the geographic location information corresponding to the historical vehicle mileage information is Beijing, the current geographic location information is Shanghai, then, said distance is the one between Beijing and Shanghai.

Whether the current vehicle data is authentic can be determined according to the mileage difference value and the distance.

Optionally, the mileage difference value should be larger than or equal to the distance, if the mileage difference value is less than the distance or even less than zero, it means that the mileage displayed by the vehicle has been falsified; thus, the current vehicle data can be determined to be unauthentic.

In this embodiment, the historical vehicle data can include a plurality of historical vehicle mileage information, as long as a comparison between the current vehicle mileage information and any of historical vehicle mileage information doesn't meet the requirement of the mileage difference value, it means that the current vehicle data is unauthentic.

In addition, it is also possible to compare the current vehicle mileage information obtained via a current OBD interface with the current vehicle mileage information as input by the user, if they are inconsistent, it means that the current vehicle data is unauthentic.

Step 204, when the determination reveals that the current vehicle data is unauthentic, evaluating a performance and a condition of the target vehicle according to the historical vehicle data, generating an evaluation report, and pushing a warning information to a user or highlighting the unauthentic information in the evaluation report.

Optionally, the warning information is configured to remind the user that the current vehicle data is unauthentic, for example, the warning information can include "warning! the current vehicle mileage information is inconsistent with the historical vehicle mileage information", or "the mileage information in the current vehicle data is unauthentic, please take care", etc.

There are various methods for pushing the warning information, for example, the warning information can be displayed in advance before the evaluation report is displayed; or as an alternative, the warning information can be sent to a user terminal, such that the user terminal can display the warning information to the user, the user terminal can be a terminal such as a mobile phone of a vehicle owner or a buyer, etc., in an actual application, a particular pushing approach can be selected according to an actual need.

Optionally, it is also possible to compare the plurality of historical vehicle mileage information in the historical vehicle data with each other, as long as a comparison of any two historical vehicle mileage information doesn't meet the requirement of the mileage difference value, it means that the mileage of the vehicle may have been unauthentic, and is unauthentic, the warning information can be output.

In the vehicle evaluation method provided by this embodiment, by obtaining the current vehicle mileage information in the current vehicle data and the historical vehicle mileage information in the historical vehicle data, and determining the authenticity of the current vehicle data according to the relationship between the historical vehicle mileage information and the current vehicle mileage information, such that errors or fraudulent conducts caused by artificially inputting or falsifying the mileage information can be avoided effectively, an accuracy of evaluation can be further improved; when the current vehicle data is unauthentic, the warning information can also be output to the user, thereby preventing the user from purchasing defective vehicles, and ensuring a life and a property security of the user.

Besides the mileage information, if the historical vehicle data and the current vehicle data share other identical item(s) too, whether the current vehicle data is authentic can be determined according to the other identical item(s).

Optionally, if both the historical vehicle data and the current vehicle data contain the item of vehicle type information, whether a historical vehicle type information in the historical vehicle data is consistent with a current vehicle type information in the current vehicle data can be determined; if the historical vehicle type information in the historical vehicle data is inconsistent with the current vehicle type information in the current vehicle data, the current vehicle data can be determined as unauthentic.

For example, the historical vehicle type information is Audi Q5, the current vehicle type information is Audi A4, it means that the current vehicle data has been falsified. By comparing the various identical items in the historical vehicle data and in the current vehicle data, a determination of whether the current vehicle data is authentic can be implemented more comprehensively.

Embodiment III

Embodiment III provides a vehicle evaluation method. This embodiment is based on the technical solutions provided by the various embodiments described above, and considers about freeze frame data of a vehicle, thereby determining whether the vehicle has had an accident when performing an evaluation for the vehicle.

Figure 3:
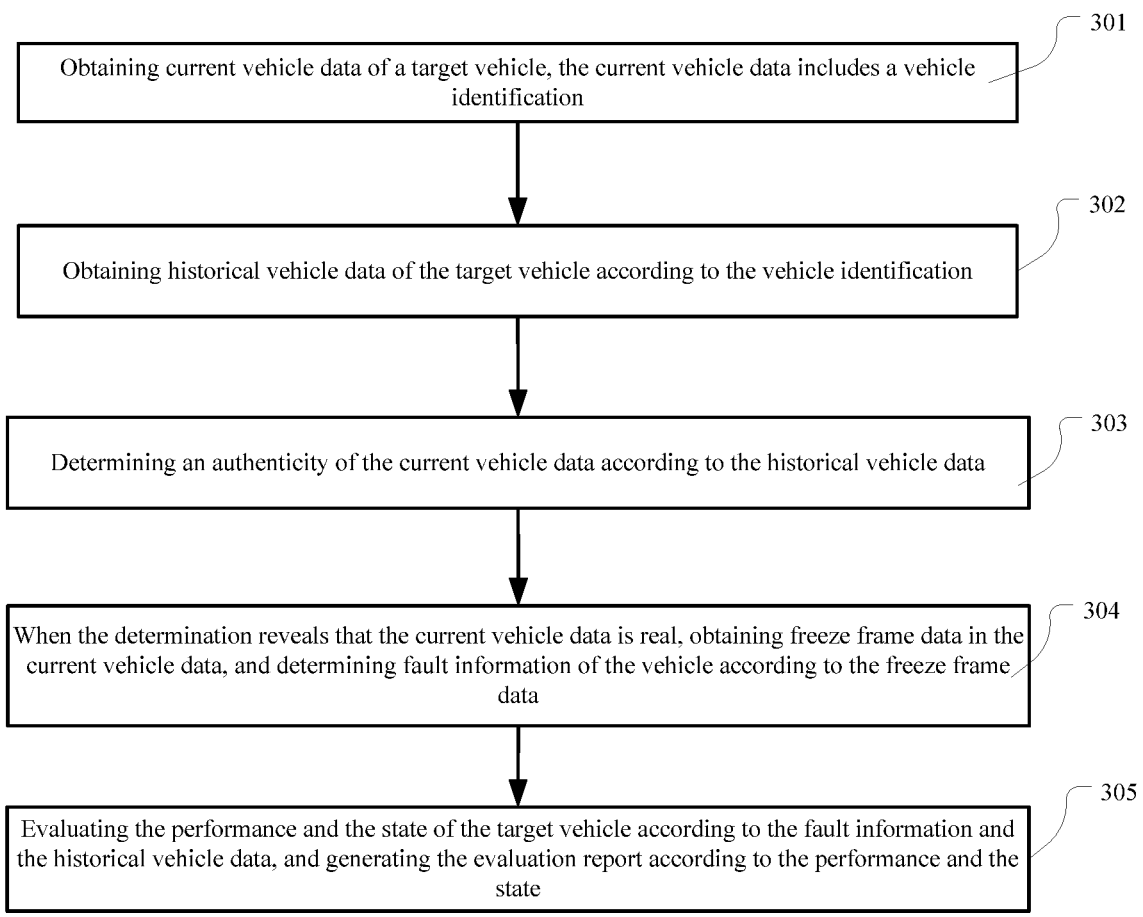
FIG. 3 illustrates a schematic flow chart of a vehicle evaluation method provided by embodiment III of the present solution.

FIG. 3 illustrates a schematic flow chart of the vehicle evaluation method provided by embodiment III of the present solution. As shown in FIG. 3, the method in this embodiment can comprise:

Step 301, obtaining current vehicle data of a target vehicle, the current vehicle data include a vehicle identification.

Step 302, obtaining historical vehicle data of the target vehicle according to the vehicle identification.

Step 303, determining an authenticity of the current vehicle data according to the historical vehicle data.

In this embodiment, regarding a detailed implementation principle of steps 301-303, please refer to steps 101-103, it is not repeatedly described herein.

Step 304, when a determination reveals that the current vehicle data is authentic, obtaining the freeze frame data according to the current vehicle data, and determining accident information of the vehicle according to the freeze frame data.

In this embodiment, the freeze frame data can be obtained through an OBD (On-Board Diagnostic) interface. When the vehicle detects that there is an abnormity which has influence on emission, it will record the freeze frame data. The freeze frame data has recorded a vehicle operation condition (e.g., vehicle speed, engine rotation speed, temperature, mileage, etc.) and an abnormity occurrence time when the abnormity occurs; in this way, an abnormal position can be positioned more accurately, the reason for the abnormity can be found out more easily when performing a maintenance.

When performing the evaluation for the vehicle, the accident information of the vehicle can be determined according to the freeze frame data, the accident information can further comprise at least one of the following items: whether the vehicle has had an accident, an accident frequency, an accident occurrence time, an accident location, a mileage corresponding to the accident, a severity of the accident, etc.

Step 305, evaluating a performance and a condition of the vehicle according to the accident information and the historical vehicle data, and generating an evaluation report according to the performance and the condition.

In this embodiment, when the evaluation report of the vehicle is generated, generation of the evaluation report can also depend on the accident information except for depending on historical data; for example, scores can be deducted or added correspondingly according to the accident information, the accident information can also be displayed on the final evaluation report.

In the vehicle evaluation method provided by this embodiment, by obtaining the freeze frame data in the current vehicle data, determining the accident information of the vehicle according to the freeze frame data, evaluating the performance and the condition of the target vehicle according to the accident information and the historical vehicle data and generating the evaluation report when determining that the vehicle data is authentic, thereby being capable of assisting the user in excluding the vehicles which have had an accident timely.

Embodiment IV

Embodiment IV provides a vehicle evaluation method. This embodiment is based on the technical solutions provided by the various embodiments described above, and performs an evaluation for a vehicle according to an evaluation result.

Figure 4:
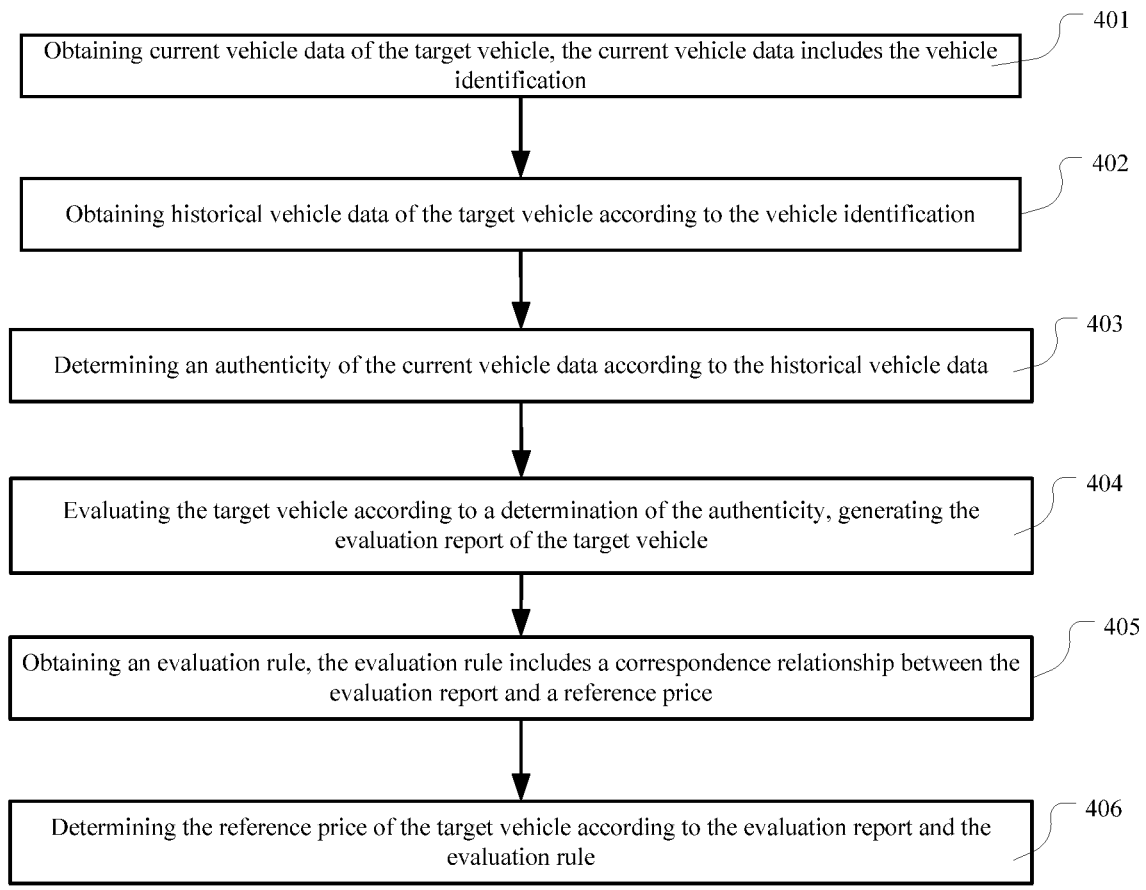
FIG. 4 illustrates a schematic flow chart of a vehicle evaluation method provided by embodiment IV of the present solution.

FIG. 4 illustrates a schematic flow chart of the vehicle evaluation method provided by Embodiment IV of the present solution. As shown in FIG. 4, the method in this embodiment can comprise:

Step 401, obtaining current vehicle data of a target vehicle, the current vehicle data includes a vehicle identification.

Step 402, obtaining historical vehicle data of the target vehicle according to the vehicle identification.

Step 403, determining an authenticity of the current vehicle data according to the historical vehicle data.

Step 404, evaluating the target vehicle according to a determination of the authenticity, and generating an evaluation report of the target vehicle.

In this embodiment, regarding a detailed implementation principle of steps 401-404, please refer to steps 101-104 in embodiment I, it is not repeatedly described herein.

Step 405, obtaining a valuation rule, the valuation rule comprises a correspondence relationship between the evaluation report and a reference price.

The correspondence relationship between the evaluation report and the reference price can be set according to an actual need. For example, when the evaluation report shows that the vehicle has sixty scores, the corresponding price is one hundred thousand dollars; or, when the evaluation report shows that the performance of the evaluation report is good, the corresponding price is one hundred and fifty thousand dollars; or, each of items in the evaluation reports can have a corresponding price, for example, once the historical maintenance frequencies adds one, the price is reduced by ten thousand dollars. The valuation rule can be pre-stored in a vehicle evaluation device, and can also be obtained from a server.

Step 406, determining the reference price of the target vehicle according to the evaluation report and the valuation rule.

After obtaining the correspondence relationship between the evaluation report and the reference price, the reference price of the target vehicle can be determined according to the correspondence relationship and the evaluation report of the target vehicle.

Optionally, the valuation rule transmitted by a vehicle transaction platform can also be obtained in step 405. Correspondingly, in step 406, after obtaining the reference price of the vehicle according to the evaluation report and the valuation rule, the reference price of the target vehicle can also be transmitted to the vehicle transaction platform.

The vehicle transaction platform can be any transaction platform or evaluation platform having vehicle transaction qualification, such as a used car transaction platform, and so on, the vehicle transaction platform can be allowed to set the valuation rule by itself, thereby meeting an individual requirement of the vehicle transaction platform.

After performing an evaluation for the vehicle, the vehicle evaluation device can determine the reference price of vehicle according to the evaluation report and the valuation rule and transmit the reference price to the vehicle transaction platform, the vehicle transaction platform can sell or demonstrate the vehicle according to the reference price of the target vehicle, so that conveniences are brought to the vehicle transaction platform.

Besides transmitting the reference price to the vehicle transaction platform, the reference price can also be output according to other approaches; for example, the reference price can be transmitted to a user terminal; or, the reference price is presented to the user; or, the reference price is uploaded onto the server to be stored, etc.

Optionally, it is still possible to obtain a template and a logo watermark preset by the vehicle transaction platform, and generate the evaluation report according to the template and the watermark. A regular diagnostic result, diagnostic information obtained via an OBD (On-Board Diagnostic) interface, historical service record, historical maintenance record, historical mileage information, historical VIN (Vehicle Identification Number) information, level or score of evaluation, reference price, and so on can be demonstrated on the same report, this report can also be printed directly by a device, and can be pushed to the user by various approaches simultaneously, the user is allowed to print the report according to the approaches such as a mobile phone, a computer, a printer, etc.

In the vehicle evaluation method provided by this embodiment, by obtaining the valuation rule, determining the reference price of the target vehicle according to the evaluation report of the target vehicle and the valuation rule, such that abundant references and accurate price suggestions can be provided in used car purchasing and selling process, a problem that it is hard for a used car dealer to define a price can be solved radically.

Based on the technical solutions provided by the various embodiments described above, preferably, the server can also include a database which is configured to store the historical vehicle data. Optionally, the database can include a plurality of databanks, such as a vehicle archive database configured to store archive information, a historical diagnosis database configured to store historical diagnostic information respectively, etc. Since data and information need to be accumulated over a long period; thus, it is possible to cooperate with the existing maintenance information companies and data companies to integrate all historical diagnosis data and archive information. Furthermore, it is also possible to establish a retrieval data correspondence database configured to retrieve all these databanks described above; meanwhile, an organization and a retrieval of each of the databanks are designed according to a four-layered sequence, that is, a manufacturer, a vehicle type, a year model, and an engine type.

Particularly, when the server obtains the first vehicle ID, it can search the manufacturer, the vehicle model, the year model, and the engine type of the vehicle in the retrieval data correspondence database according to the first vehicle identification, and then search the various databases according to the manufacturer, the vehicle model, the year model, and the engine type of the vehicle, thereby obtaining the detailed diagnosis assistance information.

By setting the plurality of databases at a server side, a search can be performed more conveniently, and a search result can be more accurate and more reliable.

Furthermore, the device can also upload information of the vehicle to the server for the server to update database. The information of the vehicle includes but is not limited to: a diagnostic result of the vehicle, record data of the vehicle such as freeze frame data, geographic location data, etc. A self-learning functionality of the database can be implemented by uploading data, such that the diagnosis assistance information in the database can be complemented and corrected continually.

For example, after obtaining the regular diagnostic result as input by the user, and/or obtaining the diagnostic information of the vehicle, said regular diagnostic result and/or obtained diagnostic information can be transmitted to the server, so that the server can update the historical vehicle data corresponding to the vehicle according to the regular diagnostic result and/or the diagnostic information, thereby implementing a self-directed leaning function of the server.

Based on the technical solutions provided by the various embodiments described above, preferably, it is also possible to perform an evaluation for an authenticity of the VIN. Particularly, it is possible to obtain at least two VINs corresponding to the vehicle, determine whether the at least two VINs are consistent, if the at least two VINs are inconsistent, a warning information is output.

Optionally, said obtaining at least two VINs of the vehicle can include at any two of following items: obtaining, via the OBD interface, the VIN corresponding to the vehicle when the vehicle leaves factory; receiving the VIN obtained by using a laser scanning device to scanning a vehicle body or by using a photographing device to photograph the vehicle body; receiving the VIN obtained by using a NFC device to scanning a driving license of a driver of the vehicle; receiving the VIN corresponding to the vehicle license plate information from the server according to the vehicle license plate information.

When the at least two VINs are inconsistent, the warning information can be output, such that the user can identify defective vehicles timely and accurately, and can be avoided from purchasing stolen vehicles, and retrofitted vehicles.

The aforesaid various embodiments merely provide exemplary modes of execution, in an actual application, the aforesaid solutions can also be added, deleted or combined as needed. It should be understood that, value of serial number of the steps in the aforesaid embodiment doesn't mean a sequencing of execution sequences of the steps, the execution sequence of each of the steps should be determined by functionalities and internal logics of the steps themselves, and shouldn't be regarded as limitation to an implementation process of the embodiment of the present application.

Embodiment V

Figure 5:
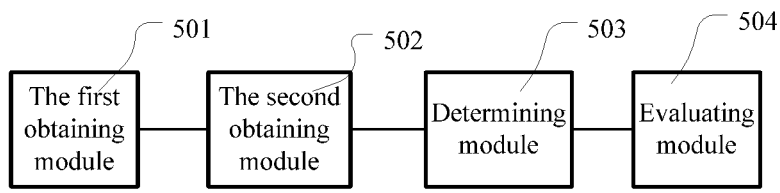
FIG. 5 illustrates a schematic block diagram of a vehicle evaluation device provided by embodiment V of the present solution.

Embodiment V of the present solution provides a vehicle evaluation device. FIG. 5 illustrates a schematic block diagram of the vehicle evaluation device provided by Embodiment V of the present solution. For describing conveniently, those parts that are related with this embodiment of the present solution are illustrated merely. The vehicle evaluation device can be a software unit, or a hardware unit, or a unit that combines software with hardware, and can also be integrated into the vehicle evaluation device as an independent accessory.

As shown in FIG. 5, the vehicle evaluation device in this embodiment can comprise: a first obtaining module 501 configured to obtain current vehicle data of a target vehicle, the current vehicle data includes a vehicle identification; a second obtaining module 502 configured to obtain historical vehicle data of the target vehicle according to the vehicle identification; a determining module 503 configured to determine an authenticity of the current vehicle data according to the historical vehicle data; and an evaluating module 504 configured to evaluate the target vehicle according to a determination of the authenticity, and generating an evaluation report of the target vehicle.

The vehicle evaluation device in this embodiment can be used for performing the vehicle evaluation method in any one of the aforesaid embodiments, regarding a specific implementation principle of the vehicle evaluation device, please refer to any one of the aforesaid embodiments, it is not repeatedly described herein.

In the vehicle evaluation method provided by this embodiment, by obtaining the current vehicle data of the target vehicle, wherein the current vehicle data includes the vehicle identification, obtaining the historical vehicle data of the target vehicle according to the vehicle identification, determining the authenticity of the current vehicle data according to the historical vehicle data, and evaluating the target vehicle according to a determination of the authenticity, and generating the evaluation report of the target vehicle, such that a detection and an evaluation of the vehicle can be implemented more comprehensively, and an accuracy of vehicle evaluation can be improved.

Optionally, the determining module 503 can be particularly configured to obtain current vehicle mileage information in the current vehicle data, to obtain historical vehicle mileage information in the historical vehicle data; and to determine the authenticity of the current vehicle data according to a relationship between the historical vehicle mileage information and the current vehicle mileage information.

Optionally, the vehicle identification includes a vehicle license plate number and a VIN (Vehicle Identification Number); the second obtaining module 502 can be particularly configured to obtain the historical vehicle data of the target vehicle according to the vehicle license plate number or the VIN.

The determining module 503 can be particularly configured to: determine whether a vehicle identification number in the historical vehicle data is consistent with a vehicle identification number in the current vehicle data by comparing when the historical vehicle data of the target vehicle is obtained according to the vehicle license plate number; determine whether the vehicle identification number in the historical vehicle data is consistent with the vehicle identification number in the current vehicle data by comparing when the historical vehicle data of the target vehicle is obtained according to the vehicle identification number; and determine the authenticity of the current vehicle data according to the determination result of consistency.

Optionally, the evaluating module 504 can be particularly configured to: evaluate a performance and a condition of the target vehicle according to the current vehicle data and the historical vehicle data, and generate the evaluation report according to the performance and the condition, when the determination reveals that the current vehicle data is authentic.

Optionally, the evaluating module 504 can be particularly configured to: evaluate a performance and a condition of the target vehicle according to the historical vehicle data, and generate the evaluation report according to the performance, the condition and inauthenticity information, when the determination reveals that the current vehicle data is unauthentic.

Optionally, the evaluating module 504 can be particularly configured to: obtain freeze frame data according to the current vehicle data, and determine accident information of the vehicle according to the freeze frame data, when a determination reveals that the current vehicle data is authentic; evaluate the performance and the condition of the target vehicle according to the accident information and the historical vehicle data, and generate the evaluation report according to the performance and the condition.

Optionally, the evaluating module 504 can be further particularly configured to: obtain a valuation rule, the valuation rule comprises a correspondence relationship between the evaluation report and a reference price; determine the reference price of the target vehicle according to the evaluation report and the valuation rule.

Optionally, the evaluating module 504 can be further particularly configured to: push warning information to the user or highlight the inauthenticity information in the evaluation report, when the determination reveals that the current vehicle data is unauthentic.

Embodiment VI

Figure 6:
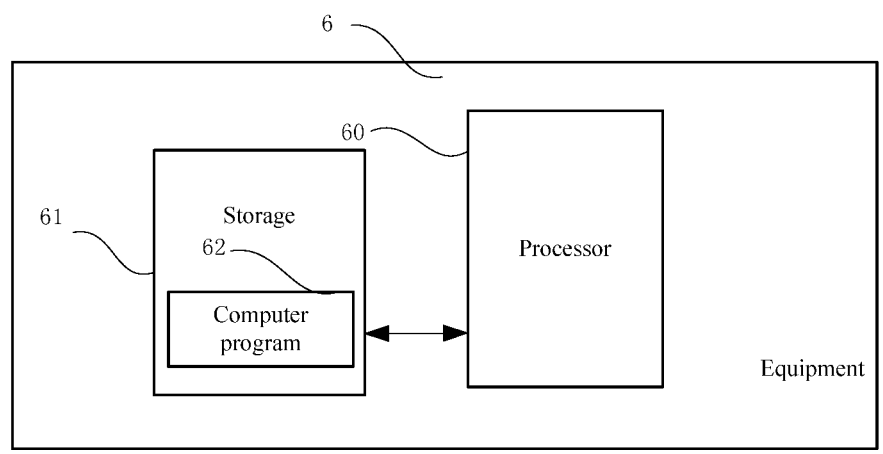
FIG. 6 illustrates a schematic block diagram of a vehicle evaluation equipment provided by embodiment VI of the present solution.

Embodiment VI of the present solution provides a vehicle evaluation equipment. FIG. 6 illustrates a schematic block diagram of the vehicle evaluation equipment provided by Embodiment VI of this solution. As shown in FIG. 6, the equipment 6 in this embodiment comprises: one or a plurality of processor(s) 60, a storage device 61 and computer program 62 stored in the storage device 61 and executable by the processor 60. The processor 60 implements steps in the aforesaid various vehicle evaluation method embodiments when performing the computer program 62.

Particularly, when performing the computer program 62, the processor 60 can implement steps as follows: obtaining current vehicle data of a target vehicle, the current vehicle data includes a vehicle identification; obtaining historical vehicle data of the target vehicle according to the vehicle identification; determining an authenticity of the current vehicle data according to the historical vehicle data; and evaluating the target vehicle according to a determination of the authenticity, and generating an evaluation report of the target vehicle.

Optionally, said determining an authenticity of the current vehicle data according to the historical vehicle data particularly comprises:

obtaining current vehicle mileage information in the current vehicle data; obtaining historical vehicle mileage information in the historical vehicle data; and determining the authenticity of the current vehicle data according to a relationship between the historical vehicle mileage information and the current vehicle mileage information.

Optionally, the vehicle identification includes a vehicle license plate number and a VIN (Vehicle Identification Number); said obtaining historical vehicle data of the target vehicle according to the vehicle identification particularly comprises: obtaining the historical vehicle data of the target vehicle according to the vehicle license plate number or the VIN.

Said determining an authenticity of the current vehicle data according to the historical vehicle data particularly comprises: determining whether a vehicle identification number in the historical vehicle data is consistent with a vehicle identification number in the current vehicle data by comparing, when the historical vehicle data of the target vehicle is obtained according to the vehicle license plate number; determining the authenticity of the current vehicle data according to a determination result of consistency; determining whether the vehicle identification number in the historical vehicle data is consistent with the vehicle identification number in the current vehicle data by comparing, when the historical vehicle data of the target vehicle is obtained according to the vehicle identification number; and determining the authenticity of the current vehicle data according to the determination result of consistency.

Optionally, said evaluating the target vehicle according to a determination of the authenticity, and generating an evaluation report of the target vehicle can particularly comprise: evaluating a performance and a condition of the target vehicle according to the current vehicle data and the historical vehicle data when the determination reveals that the current vehicle data is authentic, and generating the evaluation report according to the performance and the condition.

Optionally, said evaluating the target vehicle according to a determination of the authenticity, and generating an evaluation report of the target vehicle can particularly comprise: evaluating a performance and a condition of the target vehicle according to the historical vehicle data when the determination reveals that the current vehicle data is unauthentic, and generating the evaluation report according to the performance, the condition and inauthenticity information.

Optionally, said evaluating a performance and a condition of the target vehicle according to the current vehicle data and the historical vehicle data when the determination reveals that the current vehicle data is authentic, and generating the evaluation report according to the performance and the condition can particularly comprise: obtaining freeze frame data in the current vehicle data and determining accident information of the vehicle according to the freeze frame data when the determination reveals that the current vehicle data is authentic; evaluating the performance and the condition of the target vehicle according to the accident information and the historical vehicle data, and generating the evaluation report according to the performance and the condition.

Optionally, after evaluating the target vehicle according to the result of determination of the authenticity, and generating the evaluation report of the target vehicle, following steps can be included: obtaining an valuation rule, the valuation rule includes a correspondence relationship between the evaluation report and the reference price; determining the reference price of the target vehicle according to the evaluation report and the valuation rule.

Optionally, when performing the computer program 62, the processor 60 can also implement following steps: pushing the warning information to the user or highlighting the inauthenticity information in the evaluation report when the determination reveals that the current vehicle data is unauthentic.

As an alternative, when the computer program 62 is performed by the processor 60, functionalities of various modules/units in the aforesaid device embodiments such as the functionalities of the modules 501-504 as shown in FIG. 5 are achieved.

Preferably, the equipment 5 can be a mobile phone, a tablet device, a computer, etc., and can be a diagnostic equipment such as the diagnostic equipment with the type of X431 PRO/PRO3S/PADIII and manufactured by SHENZHEN LAUNCH SOFTWARE CO., LTD.

This embodiment of the present solution further provides a computer readable storage medium which stores computer procedure, the computer program is executed by the one or plurality of processor(s) to cause the processor to implement the steps of vehicle evaluation method by obtaining current vehicle data of a target vehicle, wherein the current vehicle data includes a vehicle identification; obtaining historical vehicle data of the target vehicle according to the vehicle identification; determining authenticity of the current vehicle data according to the historical vehicle data; and evaluating the target vehicle according to the determination of the authenticity, and generating an evaluation report of the target vehicle.

Wherein the processor is configured to implement the step of determining authenticity of the current vehicle data according to the historical vehicle data by obtaining current vehicle mileage information in the current vehicle data; obtaining historical vehicle mileage information in the historical vehicle data; and determining the authenticity of the current vehicle data according to a relationship between the historical vehicle mileage information and the current vehicle mileage information.

Wherein the vehicle identification includes a vehicle license plate number and a vehicle identification number; the processor is configured to implement the step of obtaining historical vehicle data of the target vehicle according to the vehicle identification by obtaining the historical vehicle data of the target vehicle according to the vehicle license plate number or the vehicle identification number;

wherein the processor is configured to implement the step of determining an authenticity of the current vehicle data according to the historical vehicle data by:

determining whether a vehicle identification number in the historical vehicle data is consistent with a vehicle identification number in the current vehicle data by comparing, when the historical vehicle data of the target vehicle is obtained according to the vehicle license plate number; and determining the authenticity of the current vehicle data according to the determination result of consistency; and determining whether a vehicle license plate number in the historical vehicle data is consistent with a vehicle license plate number in the current vehicle data by comparing, when the historical vehicle data of the target vehicle is obtained according to the vehicle identification number; and determining the authenticity of the current vehicle data according to the determination result of consistency.

Wherein the processor is configured to implement the step of evaluating the target vehicle according to a determination of the authenticity, and generating an evaluation report of the target vehicle by evaluating a performance and a condition of the target vehicle according to the current vehicle data and the historical vehicle data, and generating the evaluation report according to the performance and the condition, when the determination reveals that the current vehicle data is authentic.

Wherein the processor is configured to implement the step of evaluating the target vehicle according to the determination of the authenticity, and generating an evaluation report of the target vehicle by evaluating a performance and a condition of the target vehicle according to the historical vehicle data and generating the evaluation report according to the performance, the condition and inauthenticity information, when the determination reveals that the current vehicle data is unauthentic.

Wherein, the computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium can be added or reduced appropriately according to the requirement of legislation and patent practice in a judicial district, for example, in some judicial districts, according to legislation and patent practice, the computer readable medium doesn't include electrical carrier signal and telecommunication signal.

The embodiment of the present solution further provides a computer program product which comprises computer program, when the computer program is executed by the one or plurality of processor(s), the steps of the vehicle evaluation method described in any one of the aforesaid embodiments are implemented.

In the embodiments of the present invention, the descriptions of the embodiments in the present invention are emphasized respectively, in regard to the part without detailed description in some embodiments, please refer to related description in other embodiments.

As stated above, the aforesaid embodiments are only intended to explain but not to limit the technical solutions of the present application. Although the present application has been explained in detail with reference to the above-described embodiments, it should be understood for the one of ordinary skill in the art that, the technical solutions described in each of the above-described embodiments can still be amended, or some technical features in the technical solutions can be replaced equivalently; these amendments or equivalent replacements won't make the essential of corresponding technical solution to be broken away from the spirit and the scope of the technical solution in various embodiments of the present application.

What is claimed is:

1. A vehicle evaluation method, comprising:
   obtaining current vehicle data of a target vehicle, wherein the current vehicle data includes a vehicle identification;
   obtaining historical vehicle data of the target vehicle according to the vehicle identification;
   determining authenticity of the current vehicle data according to the historical vehicle data;
   evaluating the target vehicle according to the determination of the authenticity, and generating an evaluation report of the target vehicle;
   obtaining a valuation rule pre-stored in a vehicle evaluation device, wherein the valuation rule comprises correspondence relationships between evaluation reports and reference prices; and
   determining a reference price of the target vehicle according to the evaluation report and the valuation rule, and transmitting the reference price of the target vehicle to a vehicle transaction platform.

2. The method according to claim 1, wherein said determining authenticity of the current vehicle data according to the historical vehicle data particularly comprises:
   obtaining current vehicle mileage information in the current vehicle data;
   obtaining historical vehicle mileage information in the historical vehicle data; and
   determining the authenticity of the current vehicle data according to a relationship between the historical vehicle mileage information and the current vehicle mileage information.

3. The method according to claim 1, wherein the vehicle identification includes a vehicle license plate number and a vehicle identification number, said obtaining historical vehicle data of the target vehicle according to the vehicle identification particularly comprises: obtaining the historical vehicle data of the target vehicle according to the vehicle license plate number or the vehicle identification number;

said determining an authenticity of the current vehicle data according to the historical vehicle data particularly comprises:
determining whether a vehicle identification number in the historical vehicle data is consistent with a vehicle identification number in the current vehicle data by comparing, when the historical vehicle data of the target vehicle is obtained according to the vehicle license plate number; and determining the authenticity of the current vehicle data according to the determination result of consistency; and
determining whether a vehicle license plate number in the historical vehicle data is consistent with a vehicle license plate number in the current vehicle data by comparing, when the historical vehicle data of the target vehicle is obtained according to the vehicle identification number; and determining the authenticity of the current vehicle data according to the determination result of consistency.

4. The method according to claim 1, wherein said evaluating the target vehicle according to a determination of the authenticity, and generating an evaluation report of the target vehicle particularly comprises:
evaluating a performance and a condition of the target vehicle according to the current vehicle data and the historical vehicle data, and generating the evaluation report according to the performance and the condition, when the determination reveals that the current vehicle data is authentic.

5. The method according to claim 1, wherein said evaluating the target vehicle according to the determination of the authenticity, and generating an evaluation report of the target vehicle particularly comprises:
evaluating a performance and a condition of the target vehicle according to the historical vehicle data and generating the evaluation report according to the performance, the condition and inauthenticity information, when the determination reveals that the current vehicle data is unauthentic.

6. A vehicle evaluation equipment comprising a storage device, a processor and a computer program stored in the storage device and executable by the processor, wherein when the computer program is executed by the processor, the processor is configured to implement steps of a vehicle evaluation method by:
obtaining current vehicle data of a target vehicle, wherein the current vehicle data includes a vehicle identification;
obtaining historical vehicle data of the target vehicle according to the vehicle identification;
determining authenticity of the current vehicle data according to the historical vehicle data;
evaluating the target vehicle according to the determination of the authenticity, and generating an evaluation report of the target vehicle;
obtaining a valuation rule pre-stored in a vehicle evaluation device, wherein the valuation rule comprises correspondence relationships between evaluation reports and reference prices; and
determining a reference price of the target vehicle according to the evaluation report and the valuation rule, and transmitting the reference price of the target vehicle to a vehicle transaction platform.

7. A computer readable storage medium which stores a computer program, herein the computer program is executed by a processor to cause the processor to implement steps of a vehicle evaluation method by obtaining current vehicle data of a target vehicle, wherein the current vehicle data includes a vehicle identification;
obtaining historical vehicle data of the target vehicle according to the vehicle identification;
determining authenticity of the current vehicle data according to the historical vehicle data;
evaluating the target vehicle according to the determination of the authenticity and generating an evaluation report of the target vehicle;
obtaining a valuation rule pre-stored in a vehicle evaluation device, wherein the valuation rule comprises correspondence relationships between evaluation reports and reference prices; and
determining a reference price of the target vehicle according to the evaluation report and the valuation rule, and transmitting the reference price of the target vehicle to a vehicle transaction platform.

8. The vehicle evaluation equipment according to claim 6, wherein the processor is configured to implement the step of determining authenticity of the current vehicle data according to the historical vehicle data by:
obtaining current vehicle mileage information in the current vehicle data;
obtaining historical vehicle mileage information in the historical vehicle data; and
determining the authenticity of the current vehicle data according to a relationship between the historical vehicle mileage information and the current vehicle mileage information.

9. The vehicle evaluation equipment according to claim 6, wherein the vehicle identification includes a vehicle license plate number and a vehicle identification number; wherein the processor is configured to implement the step of obtaining historical vehicle data of the target vehicle according to the vehicle identification by: obtaining the historical vehicle data of the target vehicle according to the vehicle license plate number or the vehicle identification number;
wherein the processor is configured to implement the step of determining an authenticity of the current vehicle data according to the historical vehicle data by determining whether a vehicle identification number in the historical vehicle data is consistent with a vehicle identification number in the current vehicle data by comparing, when the historical vehicle data of the target vehicle is obtained according to the vehicle license plate number; and determining the authenticity of the current vehicle data according to the determination result of consistency; and
determining whether a vehicle license plate number in the historical vehicle data is consistent with a vehicle license plate number in the current vehicle data by comparing, when the historical vehicle data of the target vehicle is obtained according to the vehicle identification number; and determining the authenticity of the current vehicle data according to the determination result of consistency.

10. The vehicle evaluation equipment according to claim 6, wherein the processor is configured to implement the step of evaluating the target vehicle according to a determination of the authenticity, and generating an evaluation report of the target vehicle by evaluating a performance and a condition of the target vehicle according to the current vehicle data and the historical vehicle data, and generating the evaluation report according to the performance and the condition, when the determination reveals that the current vehicle data is authentic.

11. The vehicle evaluation equipment according to claim 6, wherein said evaluating the target vehicle according to the determination of the authenticity, and generating an evaluation report of the target vehicle particularly comprises:

evaluating a performance and a condition of the target vehicle according to the historical vehicle data and generating the evaluation report according to the performance, the condition and inauthenticity information, when the determination reveals that the current vehicle data is unauthentic.

12. The computer readable storage medium according to claim 7, wherein said determining authenticity of the current vehicle data according to the historical vehicle data particularly comprises:

obtaining current vehicle mileage information in the current vehicle data;

obtaining historical vehicle mileage information in the historical vehicle data; and determining the authenticity of the current vehicle data according to a relationship between the historical vehicle mileage information and the current vehicle mileage information.

13. The computer readable storage medium according to claim 7, wherein the vehicle identification includes a vehicle license plate number and a vehicle identification number; said obtaining historical vehicle data of the target vehicle according to the vehicle identification particularly comprises: obtaining the historical vehicle data of the target vehicle according to the vehicle license plate number or the vehicle identification number;

said determining an authenticity of the current vehicle data according to the historical vehicle data particularly comprises:

determining whether a vehicle identification number in the historical vehicle data is consistent with a vehicle identification number in the current vehicle data by comparing, when the historical vehicle data of the target vehicle is obtained according to the vehicle license plate number; and determining the authenticity of the current vehicle data according to the determination result of consistency; and determining whether a vehicle license plate number in the historical vehicle data is consistent with a vehicle license plate number in the current vehicle data by comparing, when the historical vehicle data of the target vehicle is obtained according to the vehicle identification number; and determining the authenticity of the current vehicle data according to the determination result of consistency.

14. The computer readable storage medium according to claim 7, wherein said evaluating the target vehicle according to a determination of the authenticity, and generating an evaluation report of the target vehicle particularly comprises:

evaluating a performance and a condition of the target vehicle according to the current vehicle data and the historical vehicle data, and generating the evaluation report according to the performance and the condition, when the determination reveals that the current vehicle data is authentic.

15. The computer readable storage medium according to claim 7, wherein said evaluating the target vehicle according to the determination of the authenticity, and generating an evaluation report of the target vehicle particularly comprises:

evaluating a performance and a condition of the target vehicle according to the historical vehicle data and generating the evaluation report according to the performance, the condition and inauthenticity information, when the determination reveals that the current vehicle data is unauthentic.

16. The method according to claim 2, wherein said evaluating the target vehicle according to a determination of the authenticity, and generating an evaluation report of the target vehicle particularly comprises:

evaluating a performance and a condition of the target vehicle according to the current vehicle data and the historical vehicle data, and generating the evaluation report according to the performance and the condition, when the determination reveals that the current vehicle data is authentic.

17. The method according to claim 3, wherein said evaluating the target vehicle according to a determination of the authenticity, and generating an evaluation report of the target vehicle particularly comprises:

evaluating a performance and a condition of the target vehicle according to the current vehicle data and the historical vehicle data, and generating the evaluation report according to the performance and the condition, when the determination reveals that the current vehicle data is authentic.

* * * * *